No. 846,329. PATENTED MAR. 5, 1907.
J. S. LYLE.
MACHINE FOR CLEANING AND SEPARATING COTTON FROM ITS IMPURITIES.
APPLICATION FILED AUG. 7, 1906.
3 SHEETS—SHEET 1.
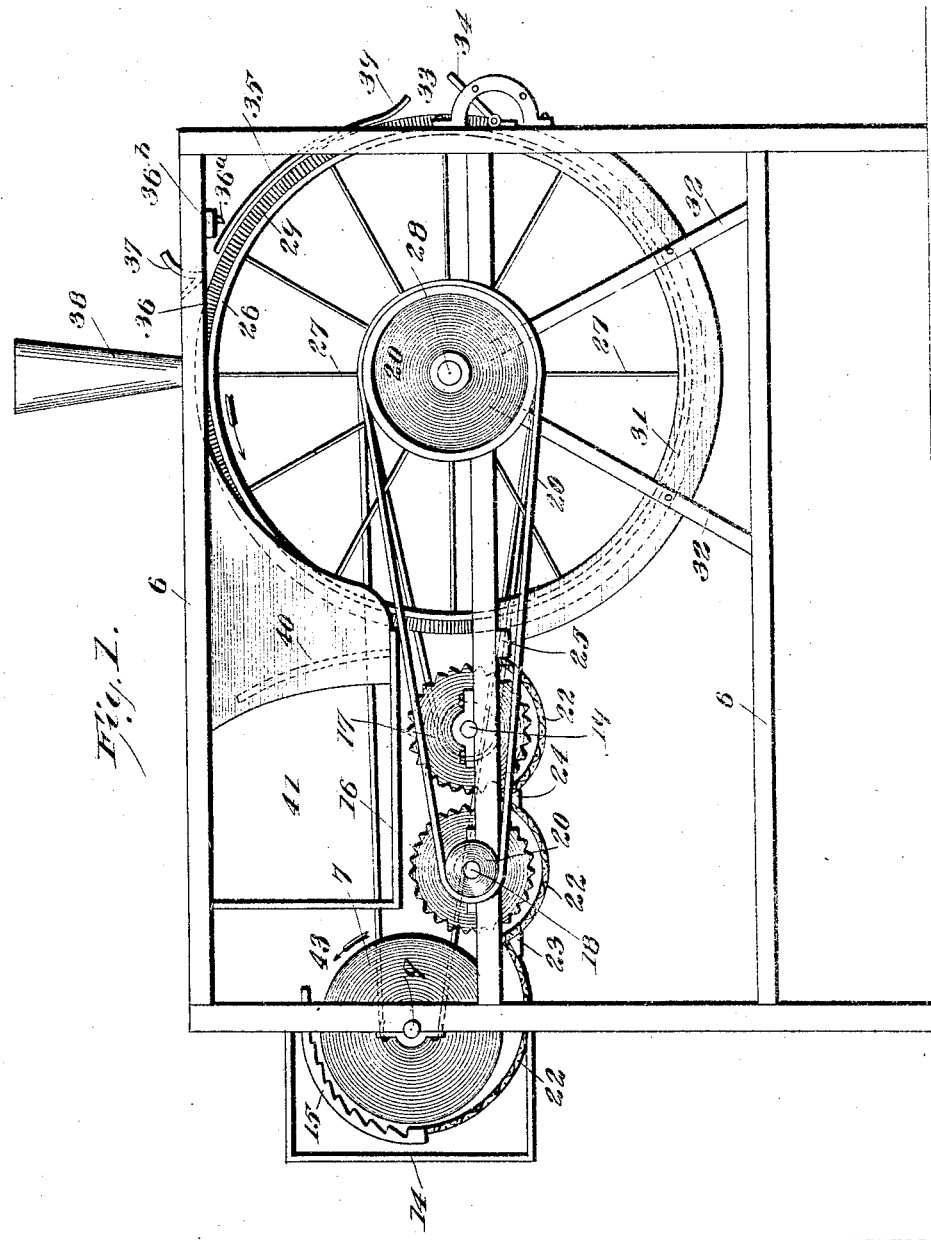
WITNESSES
INVENTOR
John S. Lyle
BY
ATTORNEYS No. 846,329. PATENTED MAR. 5, 1907.
J. S. LYLE.
MACHINE FOR CLEANING AND SEPARATING COTTON FROM ITS IMPURITIES.
APPLICATION FILED AUG. 7, 1906.
3 SHEETS—SHEET 2.
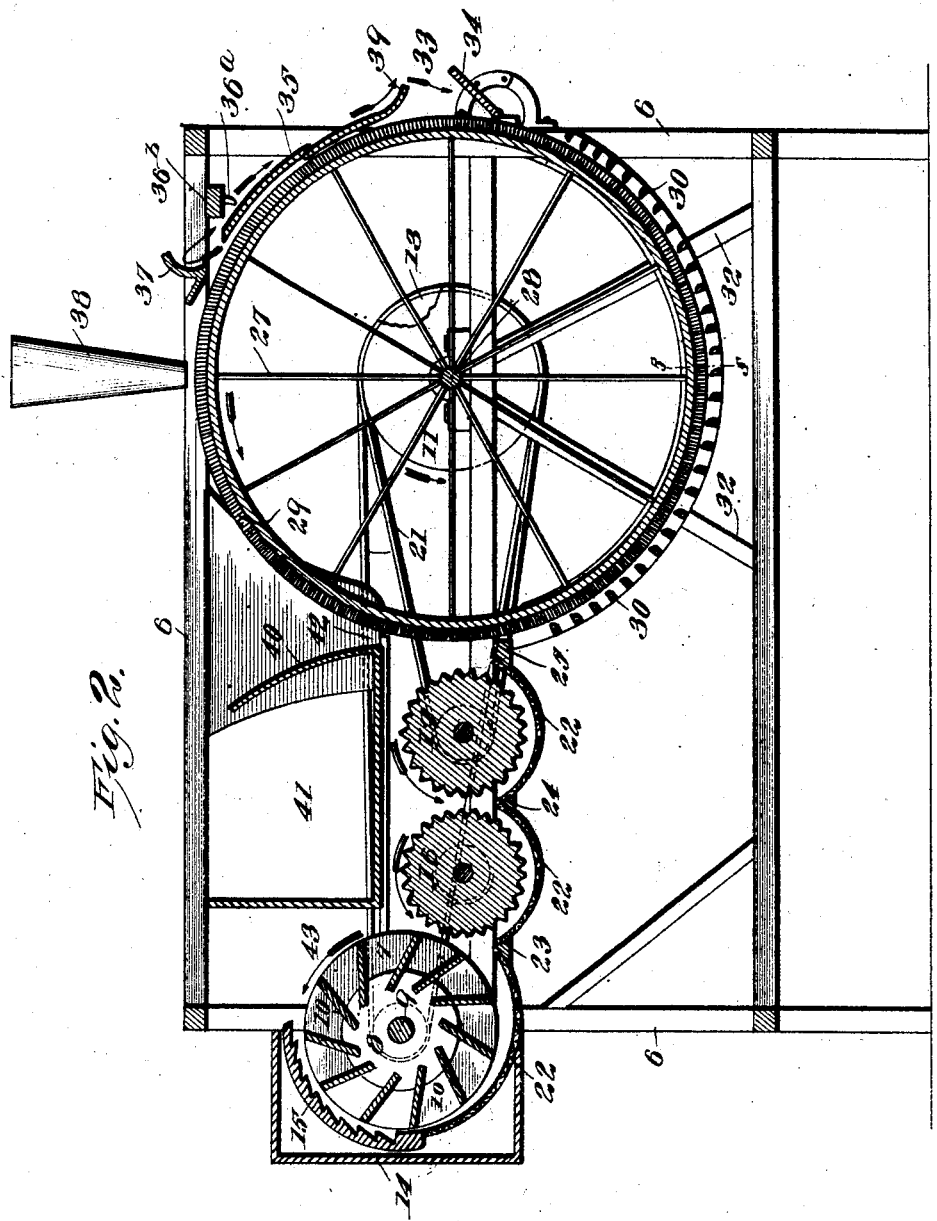
WITNESSES
E. N. Callaghan
Amos W. Hart
INVENTOR
JOHN S. LYLE
BY Munn & Co.
ATTORNEYS No. 846,329. PATENTED MAR. 5, 1907.
J. S. LYLE.
MACHINE FOR CLEANING AND SEPARATING COTTON FROM ITS IMPURITIES.
APPLICATION FILED AUG. 7, 1906.
3 SHEETS—SHEET 3.
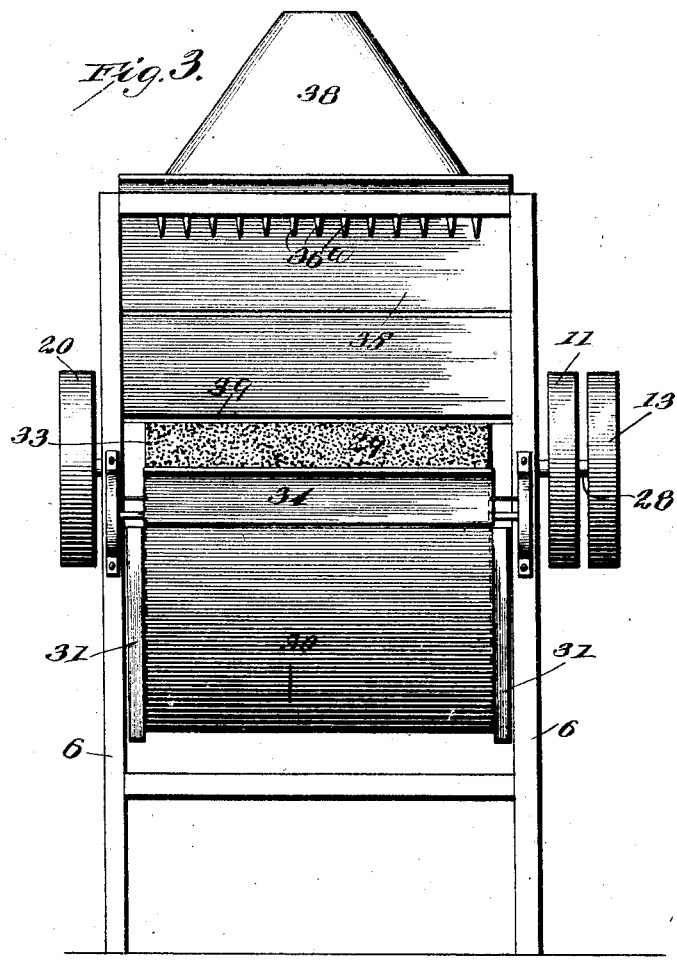
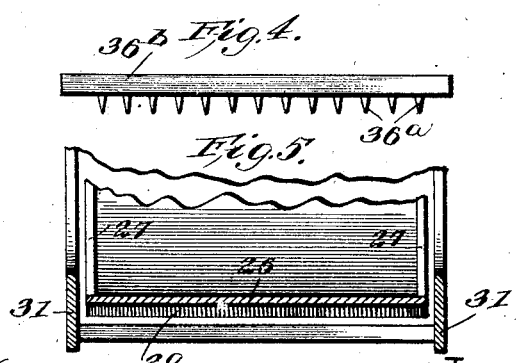
WITNESSES
E. M. Callaghan
Amos W. Hart
INVENTOR
John S. Lyle
BY Munn & Co.
ATTORNEYS

UNITED STATES PATENT OFFICE.

JOHN SAMUEL LYLE, OF McLOUD, OKLAHOMA TERRITORY.

MACHINE FOR CLEANING AND SEPARATING COTTON FROM ITS IMPURITIES.

No. 846,329.  Specification of Letters Patent.  Patented March 5, 1907.

Application filed August 7, 1906. Serial No. 329,555.

*To all whom it may concern:*

Be it known that I, JOHN SAMUEL LYLE, a citizen of the United States, residing at Mc-Loud, in the county of Pottawatomie, Oklahoma Territory, have invented a new and Improved Machine for Cleaning and Separating Cotton from its Impurities, of which the following is a specification.

This invention is a machine for cleaning and separating cotton from its impurities, and has for its object to provide an improved machine characterized by efficiency in operation while retaining simplicity and cheapness of construction and requiring a comparatively small amount of power to drive the same.

A special object of the invention is to provide a machine which will act in an improved manner upon cracked and unopened bolls, and so work upon machine-picked material, as well as hand-picked, thereby reducing the cost of gathering the cotton and increasing the yield by utilizing immature and unopened bolls. Such bolls are opened without cutting or tearing the same, thereby saving the staple and avoiding the difficulty of cleaning out mashed or finely-broken pieces of hulls.

Speaking generally, the machine consists of a breaker-drum, two corrugated rolls and screens around same, and a large drum, the outer surface of which is covered with small spikes or teeth, together with pneumatic means for removing the cotton from the drum.

The machine is illustrated in the accompanying drawings, in which—

Figure 1 is a side elevation thereof. Fig. 2 is a central vertical longitudinal section.
Fig. 3 is a rear end elevation. Fig. 4 is a detail of a guard at the end of the drum-casing. Fig. 5 is a section on the line 5 5 of Fig. 2.

Referring to the drawings specifically, 6 indicates a substantially rectangular framework to contain and support the operative parts, as hereinafter described. At the front end of this frame is journaled a rotary breaker consisting of two circular heads 7 and a circular brace 8 at the middle between the same, all fitted on a shaft 9, journaled in boxes on the sides of the frame. Paddles 10 are gained at their ends in the heads and set in slots in the brace and extend parallel to the shaft, but disposed tangentially or at an angle to the radius. The shaft is extended at the end beyond the side of the machine to receive a pulley 11, which is belted to pulley 13 on the shaft of the main or large drum.

The rotary breaker is covered by a casing 14, supported on the front of the main frame, this casing being open at the ends. Mounted within the casing is the breaker-breast 15, extending over part of the upper half of the breaker, and this breast is deeply grooved with longitudinal angular grooves, forming a corrugated surface opposite the breaker, spaced sufficiently to avoid tearing or cutting the bolls, but sufficiently near to break and open the same at their natural joints.

At 16 and 17 are indicated a pair of corrugated rolls mounted, respectively, on shafts 18 and 19, extending across the machine. The shaft 18 is driven by pulleys and belt 20 from the drum-shaft, and the shaft 19 is similarly driven by pulleys and belt 21 on the other side of the frame. These rolls have coarse corrugations which run the full length of the same.

The breaker and the corrugated rolls are inclosed on their under sides by a screen 22, formed of coarse wire-cloth of about half-inch mesh, extending from one side of the machine to the other and shaped to conform to the surface of the said rotating parts. The screen is fastened at its front end to the lower edge of the breast 15 and is supported at 23 and 24 by inverted-V-shaped pieces, which are fastened at their ends to the side pieces of the main frame. At its rear end adjacent the main drum the screen is secured to a cross-bar 25.

The main drum 26 is built on radial arms 27, connected to hubs fast on the shaft 28, which is mounted in boxes on the side frames and is extended a sufficient distance at each end to receive the pulleys. The drum is covered with sharp spikes 29, projecting radially, which act to carry the cotton as the drum rotates. The lower half of the drum is inclosed by an apron formed of spaced slats 30, extending across parallel to the drum and fastened at their ends to semicircular pieces 31, which extend inwardly from the slats a sufficient distance to lap the edge of the drum, (see Fig. 5,) so as to prevent cotton from working out at the ends. The apron is fastened at the beginning to the cross-bar 25 and at the side to the braces 32.

At the termination of the apron, at the rear of the frame, is an opening 33, extending across the machine, with an adjustable lip 34 thereunder, and above said opening is a sheet-iron casing 35 over the drum and following the shape thereof and continuing to an opening 36 at the top of the drum. The edge of the casing at said opening is set close to the drum, so that the cotton and hulls are compressed as they pass the edge and then expand in the opening, so that the hulls and heavier material is caught by the curved "huller" or separator 37 and thrown back, the cotton continuing under and beyond the edge of said huller to the mouth of the exhaust-pipe 38. This pipe has a broad and narrow mouth extending across the machine at the top of the drum, converging to a round pipe, which may be connected to any suitable exhaust-fan.

Extending across above the upper edge of the casing 35 is a guard consisting of a bar 36$^b$, with depending fingers 36$^a$. The casing 35 is extended downward, and its lower edge 39 is bent outward and located a little above the lip 34. Beyond the exhaust-pipe—that is, opposite that part of the drum between the exhaust-pipe and the beginning of the apron 30—is a curved sheet-iron plate 40, attached to a housing 41 over the corrugated rolls 16 and 17. The housing is slidable back and forth on the frame to bring the plate 40 closer to or farther from the drum, leaving an opening, however, as shown at 42, through which any cotton carried over may be returned to the drum.

In operation the raw material is fed in at 43 to the breaker, the paddles of which, in conjunction with the breast 15, break open and beat up the bolls and then pass the material to the rolls 16 and 17, the corrugated surfaces of which further work it up to dislodge dirt and trash and deliver the remainder to the large drum. The dirt, fine hulls, &c., fall out through the screen 22 as the material is carried thereover. The spikes on the large drum advance the material over the slatted apron 30, holding the cotton and allowing most of the remaining portion of the hulls and waste to drop out between the slats. The material is finally carried up between the drum and the casing 35, and on reaching the recurved huller 37 the hulls and heavier parts, which naturally, in consequence of their greater weight, collect on the outside of the layer, being carried around, are separated off by the lower edge of the huller and thrown backward and downward upon the outside of the casing 35, down which they slide to and off the lip 39, which projects the hulls beyond the edge of the apron 34; but any flakes of cotton which may be carried down with the hulls, being lighter, fall directly to the lip 34 and down the same through the opening 33 and back to the drum and are thus saved. The rake 36$^a$ also serves to catch large flocks of cotton cut out by the huller 37 and return the same to the drum. The fingers of the rake are far enough apart to allow the hulls to pass through, but catch the cotton flocks. The cleaned cotton, passing with the drum under the huller 37, is drawn off the spikes by the suction in the pipe 38 and thence carried to the gin or elsewhere. Any cotton or waste material passing the mouth of the pipe is thrown off against the plate 40, which is set at such an angle or distance that the pieces of hulls or heavier waste will be directed above or over the same into the waste-housing 41; but the lighter cotton will fall through the opening 42 and be returned to the drum.

I claim—

1. In a machine of the kind stated, in combination, a rotary breaker, a pair of beating-rolls, a screen extending partly around the breaker and rolls, a drum having spikes, a slatted apron partly surrounding the drum, and means to take off the cleaned material from the drum.

2. In a machine of the kind stated, the combination, with a rotary drum having projecting spikes, and a casing extending partly around the drum, of a device for separating the material carried around by the drum, the same consisting of a plate arranged in the opening of the casing and above the drum and curved backward, or opposite to the rotation of the drum, substantially as described.

3. In a machine of the kind stated, the combination with the drum having projections, of a casing extending partly around the same, a separating-plate extending across the drum at a space from the end of the casing and curved backwardly to throw waste back upon the outer surface of the casing, and a rake above the end of the casing and extending along said space.

4. In a machine of the kind stated, the combination with a drum having projections, of a slatted apron extending around the lower part thereof, a casing extending around part of the upper half thereof, with a space between the end of the apron and the beginning of the casing, a lip extending outwardly from said opening at an incline to return material thereto, means at the end of the casing to cut off the heavier material from the drum and return same to the outside of the casing, down which it falls to the lip, and means on the outer side of the casing to project the heavier part of said material beyond the lip.

5. In a machine of the kind stated, the combination with a drum having projections, of a casing extending partly around the upper half thereof and having an opening at its beginning for the return of material to the drum and a projecting lip under said opening, means at the end of the casing to separate the heavier part of the material being carried around by the drum and return the same upon the outer side of the casing, and a plate upon the outer side of the casing above the lip, bent out at its lower edge to project the heavier part of said material beyond the lip.

6. In a machine of the kind stated, the combination with a rotary drum having projections, and part of its surface uncovered, of an inclined plate opposite the said uncovered part arranged to receive light material thrown from the drum, the plate being inclined downwardly toward the drum, to return lighter material thereto, and means for deflecting the heavier part of the material over and beyond the said plate, as described.

JOHN SAMUEL LYLE.

Witnesses:
DILL BONNETT,
L. B. HELIKER.